June 17, 1969  P. D. PORTER  3,451,027
METHOD AND APPARATUS FOR REGULATING TEMPERATURE
Filed Oct. 7, 1966  Sheet 1 of 3

INVENTOR.
PHILIP D. PORTER
BY
ATTORNEY

June 17, 1969 P. D. PORTER 3,451,027
METHOD AND APPARATUS FOR REGULATING TEMPERATURE
Filed Oct. 7, 1966 Sheet 2 of 3

INVENTOR.
PHILIP D. PORTER
BY
ATTORNEY

June 17, 1969 P. D. PORTER 3,451,027
METHOD AND APPARATUS FOR REGULATING TEMPERATURE
Filed Oct. 7, 1966

INVENTOR.
PHILIP D. PORTER
BY
GEIB & PORTER
ATTORNEYS

United States Patent Office 3,451,027
Patented June 17, 1969

3,451,027
METHOD AND APPARATUS FOR REGULATING TEMPERATURE
Philip D. Porter, 16141 Appoline, Detroit, Mich. 48235
Continuation-in-part of application Ser. No. 463,458, May 25, 1965. This application Oct. 7, 1966, Ser. No. 595,284
Int. Cl. H01h 37/74
U.S. Cl. 337—342                       9 Claims

ABSTRACT OF THE DISCLOSURE

A thermostatic control device presettable at a desired temperature for controlling the operation of heating and cooling apparatuses to maintain the temperature of a space at the preselected level and including a bimetallic switch element exposed in heat transfer relationship with the medium in the space and biasing means for closely adjusting the temperature differential of the bimetallic switch element.

---

This invention relates to thermostatic controls such as used to regulate the temperature in an enclosed space; and the present application is a continuation-in-part of my patent application Ser. No. 463,458, filed May 25, 1965 which is in turn a continuation-in-part of my patent application Ser. No. 142,921 filed Oct. 4, 1961, now abandoned.

The temperature in a building or other heated or cooled space is often regulated by a thermostatically controlled element such as a thermostatic switch, which is subjected to the temperature within the space. The switch or other element operates, under control of a temperature responsive element, to turn on or off the heating or cooling system for the space, so that the temperature is maintained within a relatively narrow range according to the setting of the temperature responsive element.

The spiral bimetallic temperature responsive element normally used to actuate the control element or switch in a heating system, for example, adjust quickly and accurately enough to changes in temperature in the space to maintain a uniform temperature; in fact, the differential in temperature between the "On" and "Off" operation frequently amounts to several degrees. In order to correct this deficiency to some extent, a small heater is frequently incorporated in the bimetallic element, and wired to the contacts of the thermostat. This heating element, known to the trade as a "heat anticipator," heats the inside of the thermostat when the current is on, and thereby speeds up its reaction, so that the thermostat turns off the heating system sooner than if the temperature responsive elements were dependent solely on increase in temperature within the space. While the "heat anticipator" decreases the temperature differential, it has not been entirely satisfactory for close temperature regulation.

I have discovered a very simple and practical means for closely adjusting the temperature differential of a thermostatically controlled element, so that the differential may be decreased to a such smaller value than has heretofore been possible, and with much less expensive modification of the thermostatic element. This discovery resides in the application of an extraneous and relatively light biasing force which tends to assist the action of the temperature responsive (usually spiral bimetallic) switch operating element to increase or decrease the differential; whichever is desired.

If it is desired to lessen the differential between the "On" and "Off" temperatures at which the switch operates, this extraneous and relatively light biasing force is so applied as to assist the bimetallic temperature responsive element in actuating the switch from the "On" to "Off" position.

By selection of the proper force to assist the thermostatic element but insufficient to actuate the switch itself until the surrounding temperature is at the correct value, a very small differenial, less than has been possible in known devices, may be attained. Accordingly, a bimetallic temperature responsive element may, at slight expense, be made to operate to regulate the temperature within the heated or cooled space much more closely than has heretofore been possible.

As indicated hereinbefore, it is among the objects of the present invention to adjust the temperature differential of actuation of a thermostatically actuated control element by applying an extraneous and relatively light but direct and positive biasing force to assist the action of the bimetallic temperature responsive operating element, so that the differences in temperature in the heated or cooled space producing the "On" and "Off" operations of the control element will be much smaller than is possible with any of the known prior art devices.

Another object is to adjust the temperature differential of actuation of a thermostatically actuated control element by applying an adjustable relatively light extraneous biasing force to assist the action of the temperature responsive operating element, so that adjustment of the biasing force will change the temperature differential at which the control element operates so as to produce short heating or cooling cycles and close regulation of temperature, or long cycles with a greater differential.

Still another object is the attainment of the foregoing ends with apparatus which is simple in construction, durable, and has flexibility of design.

Further objects and advantages of the invention will be apparent from the following description and annexed drawings wherein like reference numerals designate like parts and wherein:

FIGURE 1 is a fragmentary elevational view illustrating a thermostatically controlled switch and its temperature responsive spiral bimetallic switch operating element together with an extraneous device or attachment which has been constructed in accordance with the teachings of the present invention; said attachment being in the form of a spring member which biases the switch out of its closed or control position. By proper adjustment, the differential temperature at which the temperature responsive spiral bimetallic switch operating element will act to open the switch may be decreased to an extremely small value.

FIGURE 2 is a view which is generally similar to that of FIGURE 1, but wherein another form of inventive attachment is shown as comprising the modification of the mercury switch to include a very substantially extended lead wire; said modified lead wire (or attachment) being of such lengths as to pass between the mercury switch and its supporting bracket and project therefrom to extend counterclockwise around the temperature responsive spiral bimetallic switch operating element for attachment to one of the terminals which are conventionally disposed immediately therebelow; salid substantially extended lead wire being adaptable through its curved portion to exert a biasing force on the mercury switch which tends to move it into open position.

FIGURE 3 is a view which is similar in nature to FIGURES 1 and 2, but illustrating an extraneous attachment embodying the teachings of the present invention as comprising an adjustably anchored coil spring having one end thereof so connected to the operating arm of the temperature responsive spiral bimetallic switch operating element as to influence it, and the mercury switch by which it is carried, into such position as will open the switch.

FIGURE 4 illustrates another modification, according to which a metallic strip is connected at one end to the post of the temperature responsive spiral bimetallic switch operating element and at its other end to the operating arm of the temperature responsive spiral bimetallic switch operating element, the manner of connection being such as to bias the actuating arm to open the switch when the temperature reaches the set value.

FIGURE 4a is a perspective view illustrating more clearly the metallic strip of the embodiment of FIGURE 4.

FIGURE 5 illustrates a modification wherein the attachment of the present invention comprises a metallic screw which is screw-threadedly received in an aperture of the actuating arm of the temperature responsive spiral bimetallic switch operating element; the arrangement being such that the metallic screw acts as a counter-weight to bias the mercury switch in either direction and thereby adjust the differential in temperature.

Figure 1:
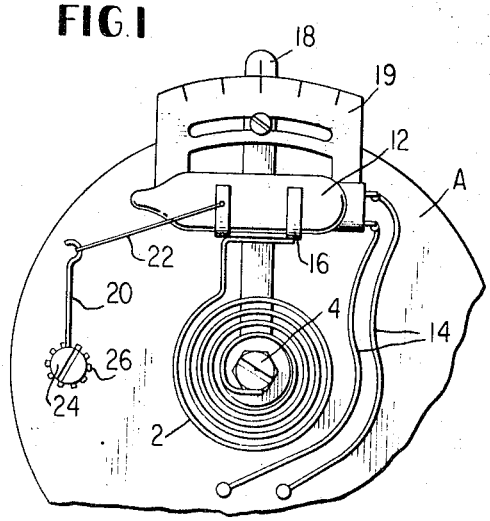

Referring more particularly to the drawings, and especially FIGURE 1, the letter A generally designates a base plate upon which there is mounted a conventional temperature responsive spiral bimetallic switch operating element 2, the first or innermost convolution of the spiral being affixed to a horizontally extending post 4. The outer end of the temperature responsive spiral bimetallic switch operating element 2 extends vertically from the outer convolution then projects at right-angles to form a horizontal shelf. This last-mentioned portion of the temperature responsive spiral bimetallic switch operating element 2 is provided with a bracket 16 to which the mercury switch 12 is secured against displacement.

The mercury switch 12 is provided with the usual leads 14 which are connected to the electric motor which operates the temperature changing device, i.e., heating or cooling apparatus. The heating or cooling apparatus as such forms no part of the present invention and, accordingly, is neither shown in the accompanying drawings nor referred to more specifically hereinafter.

It will be understood that as viewed in FIGURES 1 through 6, the conventional temperature responsive spiral bimetallic switch operating element is presumed to be in such position that the mercury switch which it carries is in the closed or control position and that the opening of the contacts of said switch will require its movement to the left.

The post 4 is rotatable on the base plate A so that the temperature responsive spiral bimetallic switch operating element may be partially rotated on its axis for adjustment of the bracket 16 and its affixed mercury switch 12.

Also secured to the temperature responsive spiral bimetallic switch operating element 2 (either directly or through the agency of the post 4) is an indicator arm 18 which is movable with respect to a cooperating scale 19 to indicate the position to which the temperature responsive spiral bimetallic switch operating element 2 is adjusted and accordingly, the temperature at which the mercury switch 12 is actuated.

The mechanism, described immediately hereinbefore, is conventional thermostatic switch apparatus and it so operates as to react only to a differential of several degrees between the "On" and "Off" operations of the switch 12.

According to the embodiment of the present invention which is illustrated in FIGURE 1, this differential is much further reduced by applying the force of a spring strip 20 to bias the mercury switch 12 to the left and out of its closed or control position through the connection 22 to bracket 16. The spring strip 20 is adjustably secured to the base A by a screw 24 and toothed lock washer 26, according to which the tension of the spring strip 20 may be adjusted to exert the necessary force to move the switch 12 when the temperature responsive spiral bimetallic switch operating element 2 is exposed to the selected temperature. By proper adjustment, the differential in temperature at which the temperature responsive spiral bimetallic switch operating element 2 will open the switch 12 may be decreased to a very small value.

Figure 2:
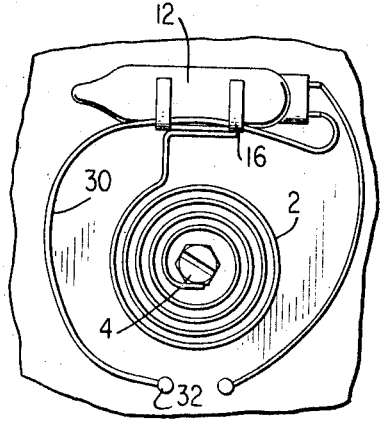

The embodiment of FIGURE 2 also contemplates the application to the mercury switch of a biasing force which tends to move it to the left and into open position; and, as indicated earlier herein, this is accomplished through the medium of a spring element which extends in a counter-clockwise direction partially around the temperature responsive spiral bimetallic switch operating element. According to this embodiment, the lower of the two lead wires of the mercury switch 12 may be replaced by, or supplemented with, an elongate wire 30 of suitable springiness, which passes between said mercury switch and its supporting bracket 16, and then projects in counter-clockwise fashion partially around the temperature responsive spiral bimetallic switch operating element 2 for attachment to one of the terminals 32 which are conventionally disposed immediately therebelow on the base plate A. As an alternative, the elongate wire 30, although similarly shaped, may be formed entirely separate and apart from the lower lead wire of the mercury switch 12. In such instance, one of the ends of the separate spring wire is connected at an appropriate location to the base plate A, while the end thereof is connected to the mercury switch or one of its supporting instrumentalities, whichever is desired.

Figure 3:
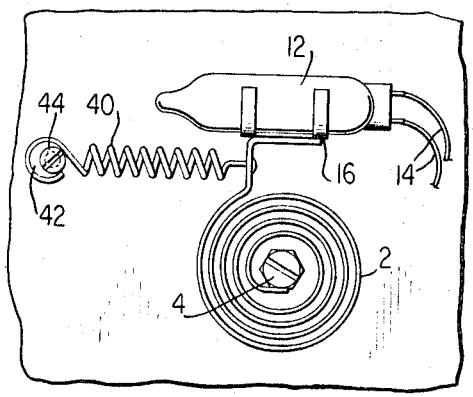

In the embodiment of FIGURE 3, there is a coil spring 40 having one end so connected to the operating arm of the temperature responsive spiral bimetallic switch operating element as to influence it, and the mercury switch, into such position as will open the switch. The other end of the coil spring 40 extends from the operating arm of the temperature responsive spiral bimetallic switch operating element 2, in a direction which is to the left (i.e., generally counterclockwise); and is secured to an eccentric 42 carried by a screw 44. According to this arrangement, the partial rotation of the eccentric 42 by the screw 44 will adjust the tension of the coil spring 40.

Figure 4:
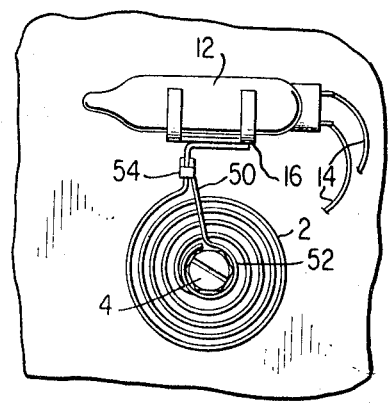

In the embodiment of FIGURE 4, a metallic wire or strip 50, of suitable springiness, is formed with a contractile loop 52 which grips the polygonal head of the post 4, while the opposite (and upper) end thereof is forked, as at 54, in order to engage the operating arm of the temperature responsive spiral bimetallic switch operating element 2. By turning the spring-like wire or strip 50 about the post 4, it may be so tensioned as to exert a biasing force which will open or close the switch, thereby providing a wide range of regulation of the differential in temperature for "On" and "Off" operation. The grip on the polygonal head of the post 4 is sufficient for any biasing force which is required, by the teachings of the present invention, to be applied to the switch.

Figure 5:
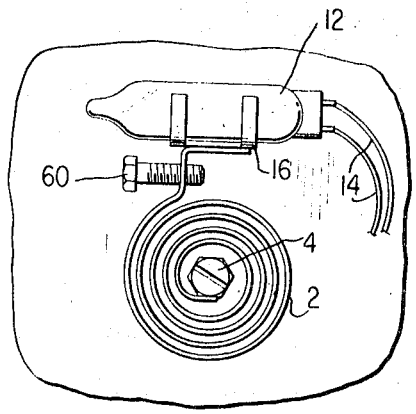

Referring to FIGURE 5, the embodiment shown therein comprises a screw 60 which is in screw-threadedly engagement with an aperture in the upwardly-extending operating arm of the temperature responsive spiral bimetallic switch operating element 2. According to such construction, the screw 60 serves as a counterweight and the adjustment thereof acts to bias the mercury switch in either direction to thereby adjust the differential in temperature.

Figure 6:
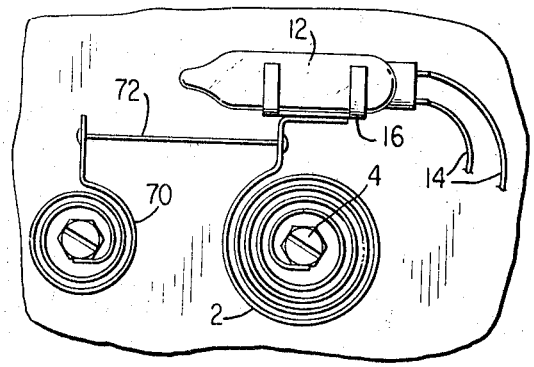
FIGURE 6 illustrates a further modification wherein a second temperature responsive spiral bimetallic switch operating element of lesser power has its operating arm connected to the operating arm of the main temperature responsive spiral bimetallic switch operating element, and in such manner as to bias the mercury switch towards the open position when the temperature reaches the set value.

The modification of FIGURE 6 comprises the combining with the main temperature responsive spiral bimetallic switch operation element 2 of a second temperature responsive spiral bimetallic switch operating element 70; the operating arms of the two elements 2 and 70 being connected by a mechanical link 72. The second temperature responsive spiral bimetallic switch operating element 70, as in the case of its counterpart 2, is provided with a mounting post 4 by means of which its setting is adjustable.

Figure 7:
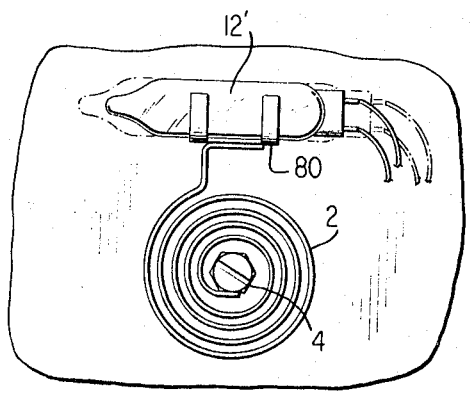
FIGURE 7 illustrates a further modification wherein the switch element and supporting bracket are so constructed as to permit relative longitudinal adjustment of the switch element as illustrated in dotted lines.

FIGURE 7 illustrates a modification wherein the switch member 12' is not fixedly attached to the bracket 80 but is so mounted thereon as to permit of its being manually shifted relative to the thermostatic element, as shown by the dotted lines. In this respect, the switch member itself acts as a counterweight to bias the switch in one direction so as to assist the thermostatic element in operating the switch.

Figure 8:
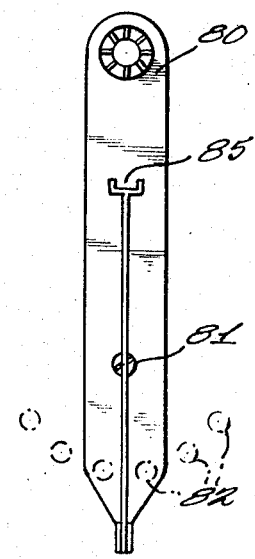
FIGURE 8 is an elevational schematic view illustrating the application of the teachings of the present invention to a dual purpose thermostat for both heating and cooling (air conditioning).
Figure 9:
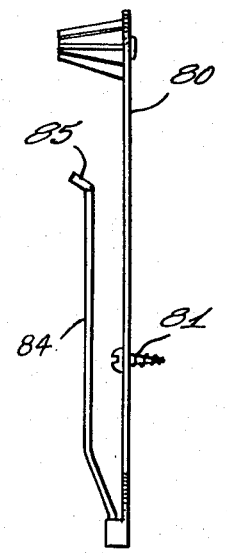
FIGURE 9 is a side elevational view of the showing of FIGURE 8.
Figure 10:
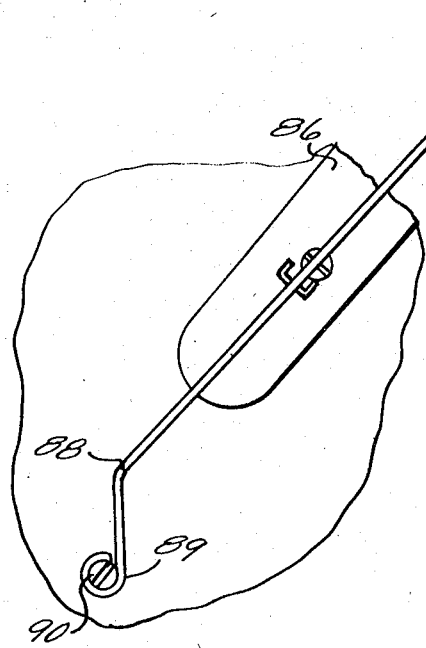
FIGURE 10 is an elevational schematic view illustrating another manner of applying the teachings of the present invention to a dual purpose thermostat.

FIGURES 8, 9 and 10 illustrate the manner in which a single biasing element may be applied to a dual purpose thermostat as in the case of a heating system and a cooling system for air conditioning.

In FIGURES 8 and 9, the number 80 generally designates a blade switch for directing control to either heating or cooling. This blade switch 80 is pivotally mounted as at 81, and in its swinging movement to left or right engages electrical contacts 82 which complete the circuit to the heating or cooling means, as the circumstances require.

Figure 4A:
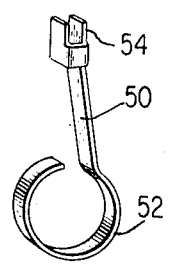

An elongate biasing spring 84 extends in parallelism with a substantial portion of the blade switch 80 and the lower ends of these elements are secured together as shown whereby they travel together. The upper end of this elongate biasing spring 80 is provided with a fork 85 which engages on either side the (bimetallic) temperature responsive element (not shown). Thus, this embodiment is somewhat similar to the embodiment of FIGURES 4 and 4a.

In FIGURE 10 the blade switch 86 is pivoted as at 87 and carries a substantially parallel elongate biasing spring 88. The lower end of this elongate biasing spring 88 is provided with a contractile loop 89 which is solidly secured by a screw 90 to the base plate of the control apparatus.

As in the case of the embodiment of FIGURES 8 and 9, the upper end of the elongate biasing spring 88 is provided with a vertically extending fork 91 which engages either side of the temperature responsive element.

Whichever of the illustrative embodiments is employed, the operation of the device is the same. In each instance there is employed an extraneous device or attachment which applies an adjustable relatively light biasing force to assist the action of the temperature responsive spiral bimetallic switch operating element 2 so that the adjustment of the biasing force will change the differential in temperature.

Whether the extraneous (or additional) force exerting element takes the form of a spring or weight, and whether the force is applied directly to the switch 12, the switch-supporting bracket 16, or the operating arm 70 of the temperature responsive spiral bimetallic switch operating element, 2, the application of said force is direct and positive and the actuation of the control takes place at the correct increase in temperature after a cyclical operating of the heating or cooling system.

If it is desired to reduce the differential in temperature, the means for exerting the force to bias the control element (i.e. the switch 12) from the control position may be adjusted so that the element is actuated upon a slight increase in temperature to the value desired.

The teachings of the invention contemplate the adjustment of the force exerting means to exert a direct and positive force which opposes the actuation of the control element to increase the temperature differential should such be desired.

It will be understood by those skilled in the art that the present method is not limited to any particular type of temperature responsive element.

Having thus described my invention, what I claim as new and desire to secure by Letters Patent is:

1. A thermostatic control device for controlling the operation of heating and cooling apparatuses to maintain the ambient temperature of a space at a preselected level, said control device comprising a base, a bimetallic thermostatic element mounted on said base and disposed in contact with the medium in the space for heating and cooling thereby, said bimetallic thermostatic element including a movable portion movable in response to changes in the ambient temperature of the space, switch means operatively associated with said movable portion and actuable in response to movement of said movable portion from a static position corresponding to the presettable controlled ambient temperature to a position displaced therefrom, mechanical biasing means for yieldably restraining movement of said movable portion from said static position, and a biasing thereof when displaced toward said static position, said biasing means ineffective when said movable portion is in said static position.

2. The thermostatic control device as defined in claim 1 in which said bimetallic thermostatic element is spirally wound having its inner end secured to a mounting post projecting from said base and the other end thereof comprising said movable portion.

3. The thermostatic control device as defined in claim 1 in which said biasing means comprises a spring.

4. The thermostatic control device as defined in claim 1 in which said biasing means comprises a counterweight.

5. The thermostatic control device as defined in claim 1 in which said switch means comprises an electric mercury switch.

6. The thermostatic control device as defined in claim 1 in which said biasing means are adjustably mounted on said device.

7. The thermostatic control device as defined in claim 2 in which said biasing means comprises a spring having one end mounted on said post and the other end thereof engageable with said movable portion.

8. The thermostatic control device as defined in claim 3 in which said spring is electrically conductive and is electrically connected to said switch means.

9. The thermostatic control device as defined in claim 3 in which said spring is a coil spring.

References Cited

UNITED STATES PATENTS

| 1,516,195 | 11/1924 | Lewerenz. | |
| 1,676,794 | 7/1928 | Mailey | 73—363.7 |
| 1,899,670 | 2/1933 | Chromy | 200—122 |
| 2,175,721 | 10/1939 | Taylor | 200—138 |
| 2,228,522 | 1/1941 | Johnson | 200—67 |
| 2,357,533 | 9/1944 | Meza | 200—138 |

BERNARD A. GILHEANY, *Primary Examiner.*

R. L. COHRS, *Assistant Examiner.*